Figure 2:
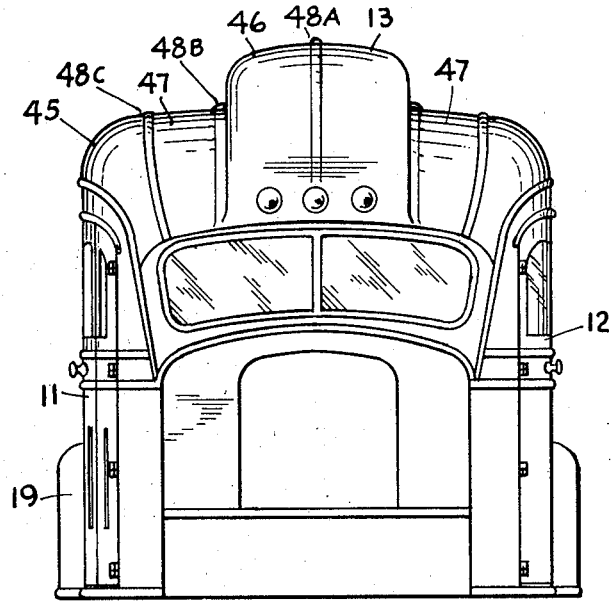

July 26, 1938.  B. S. SNOWDEN  2,125,205
REFRIGERATION TRUCK BODY OF THE WALK-IN TYPE
Filed Nov. 30, 1937  3 Sheets-Sheet 1
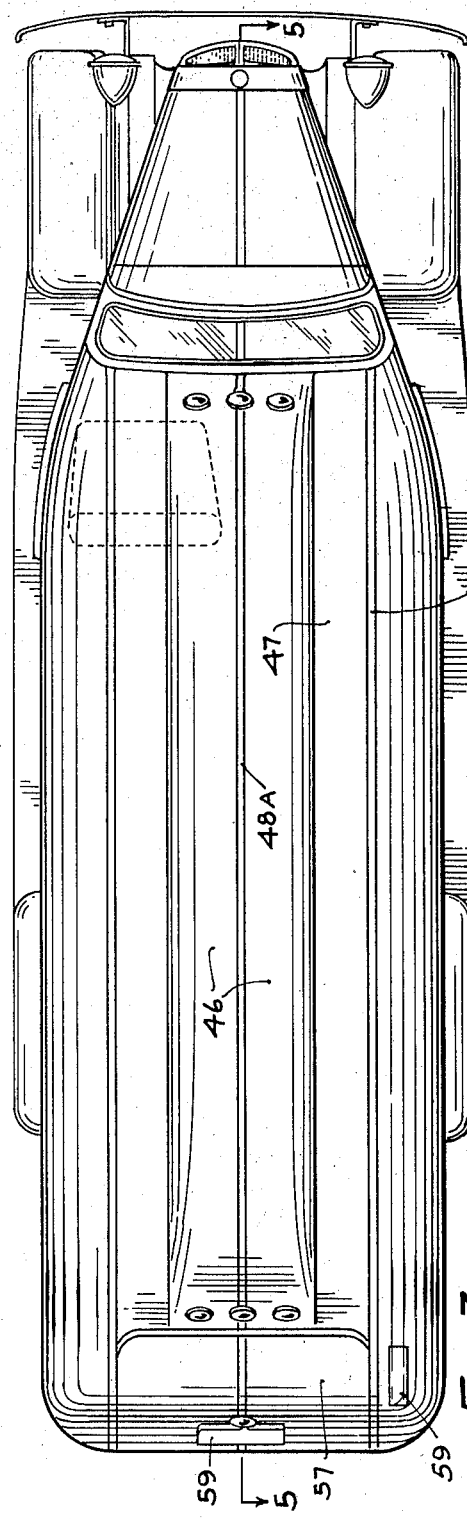
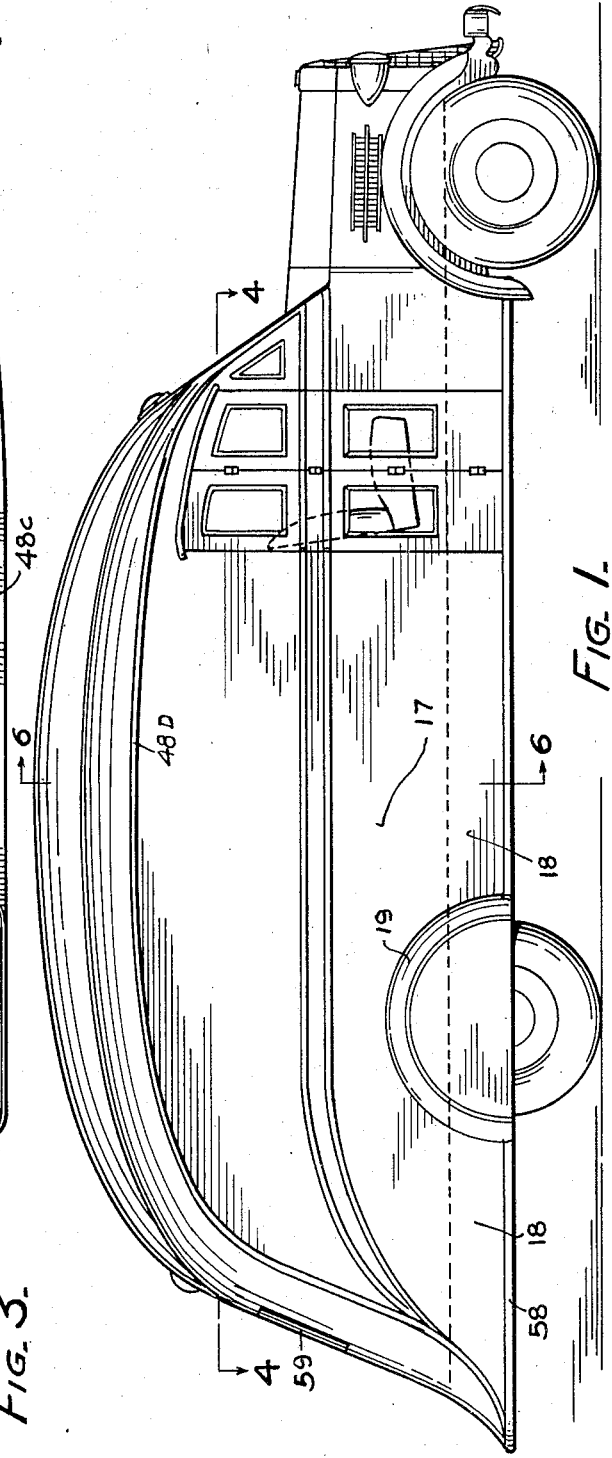

July 26, 1938.  B. S. SNOWDEN  2,125,205
REFRIGERATION TRUCK BODY OF THE WALK-IN TYPE
Filed Nov. 30, 1937  3 Sheets-Sheet 2

INVENTOR.
BYRON S. SNOWDEN
BY Louis Selmer
ATTORNEY.

July 26, 1938.  B. S. SNOWDEN  2,125,205

REFRIGERATION TRUCK BODY OF THE WALK-IN TYPE

Filed Nov. 30, 1937   3 Sheets-Sheet 3

INVENTOR.
BYRON S. SNOWDEN.
BY Louis Illmer
ATTORNEY

Patented July 26, 1938

2,125,205

UNITED STATES PATENT OFFICE 2,125,205

REFRIGERATION TRUCK BODY OF THE WALK-IN TYPE

Byron S. Snowden, Albany, N. Y., assignor to General Ice Cream Corporation, Schenectady, N. Y., a corporation of New York Application November 30, 1937, Serial No. 177,259

11 Claims. (Cl. 62—1)

This invention relates to an advance in the art of body building for automotive vehicles and more particularly pertains to a refrigerated truck body of the compartmental type designed to facilitate sanitary door-to-door delivery of transported goods, being especially adapted to expedite the handling of an assortment of ice cream or the like frozen products that are to be kept artificially cooled without melting or other loss in quality while in transit at an economical expenditure of refrigerant and which body shall among other advantages, afford improved accessibility to its pay load contents, irrespective of the width dimension given to such body.

A further innovation resides in providing for a unitary van body that shall be attractive and of finely stream-lined contour having stabilized proportions whose side panel height may be kept within reasonable limits to obviate top-heavy appearance, notwithstanding that the thick floor and deck walls of my refrigerated cargo chamber may be heavily insulated against heat absorption. In order to snugly fit these inherently heavy body walls in conformity with the shape of the intended pay load, I purposely resort to a medially raised roof component or monitor whereby to secure adequate head room over a longitudinally cleared gangway or walk-in aisle without having to correspondingly raise each side panel to the extreme body height.

An assortment of covered portable cans or cartons of ice cream, initially frozen dairy products or the like confectionery may be stacked on suitable racks (without individual icing) along each side of such aisle for delivery on orders to diverse distant customers without need of re-allocation. The monitor of my cargo chamber is further designed to promote a natural convection of air currents in order to facilitate holding for a prolonged trip period, all such frozen goods in a properly hardened condition at a comparatively low temperature of less than 10° Fahrenheit, while en route. That is to say, a hot weather differential of some 90° Fahrenheit or more, may herein be employed as contrasted with the more moderate requirement of half this range usually needed for transporting refrigerated milk, meat or the like commodities. Ice cream products tend to depreciate in quality and selling value when allowed to attain a temperature in excess of 10° to 15° Fahrenheit, during transport.

The need on part of the driver or other attendant, to frequently step down on the road bed when making delivery of a specifically ordered assortment of frozen goods to scattered customers, is both fatiguing and time consuming. Resort is therefore had to a relatively short transverse seat located laterally of the gear shift lever and forwardly of my refrigerated body chamber. Contiguous to one such seat end, there is provided a forward floor pit including a sunken platform that preferably lies one step above the level of the road bed when carried on a conventional truck chassis without drop or laterally deflected frame members.

An insulated transverse bulkhead partitions said sectionalized body into a cab or driver's control compartment and an artificially illuminated refrigerator compartment. My cooling chamber is normally kept closed except for a hermetically sealed, single doorway located adjacent to said pit. This doorway preferably constitutes the sole opening into and through the confining walls of such chamber and eliminates the need for a plurality of conventional side or top servicing doors. My swinging door is hinged at its jamb edge lying next adjacent to said one seat end and compactly arranged to swing outwardly and forwardly over the sunken pit toward the driver's seat. Ready access on the truck floor level is thereby gained to the chamber contents without being obliged to leave said door open for a protracted period after entering my refrigerated compartment. The driver's control cab is preferably equipped with an independent foldable side door that opens into the pit and provides for a closable ante-chamber or trapped vestibule through which to protectively service my cooled cargo chamber without abnormal loss of refrigeration or materially affecting the interior temperature of such storage space. To this end, the gross volumetric content of such vestibule is preferably kept comparatively small in proportion to that of my unitary cargo chamber.

All confining walls including the single entrance door leading into the cooled compartment, may be heavily sheet insulated with cork, glass wool or the like material to render them substantially impervious to heat transfer, particularly when the truck operates under summer weather conditions. The required refrigeration to said chamber may be supplied in any suitable manner such as the use of dry ice or by mechanical refrigeration as embodied in a driven compressor of either the remote or attached type. It is herein preferred however, to resort to a separate rear body compartment in which to install an intermittently driven electric motor unit including a compressor and a condenser using methyl chloride or the like refrigerant which is pipe connected to vertically or horizontally disposed evaporating coils of the plate type located interiorly along certain side walls or roof of my refrigerated chamber.

In practice, my refrigerator compartment may be loaded during night-time with an assortment of frozen goods while the truck remains stored in a garage or central depot, the motor unit then being plugged into a power circuit to have the body and its stacked contents thoroughly refrigerated by morning, prior to starting on another regular delivery trip. Subsequent to disconnecting the motor circuit, this hold-over basis insures an adequate supply of liquified refrigerant to maintain the transported goods at a prescribed temperature for many consecutive hours, there being automatic cutout or the like control devices provided which regulate the release rate of the vaporized liquid in accordance with the truck cooling needs while in transit.

The present development may be clarified by reference to a common prior type of ice cream delivery truck. For such purposes, it has been customary to mount a cooled pay load body having cells of comparatively low floor to deck height behind a conventional or butt cab, each of these plural body cells being equipped with a separate short side servicing door that opens outwardly toward the curb. In such structure, any particular stored goods are only accessible by holding a side door of this kind widely open while the driver crawls or otherwise reaches inwardly for a certain kind of frozen goods that are to be allocated. In the ordinary course of delivery, one or more of such doors are likely to be opened fifty or more times during each daily trip. Such refrigerated cells are thereby repeatedly placed in direct communication with a relatively hot surrounding atmosphere which by thermo-siphon action, results in abnormal escape of the refrigerated body air during each door opening period. Its replacement by warmer outside air tends to objectionally raise the cell temperature until re-cooled and hence calls for a corresponding increased expenditure of refrigerant.

An aim of the present invention is to reduce such wastage in refrigeration by trapping the free escape of cooled air between my closable cab and said single walk-in doorway. Furthermore, the entrance leading into my cooled chamber may, without need of correspondingly raising the side walls, be kept sufficiently high to provide for full height head-room that will allow the attendant to walk comfortably along a central body aisle without any crawling or pronounced stooping and in which body an adequate pay load capacity shall be afforded for a given tare weight. The present intent is to allow of promptly closing such single door behind the driver while deliberately picking out some particular kind of ordered goods in the cooling chamber during a delivery stop without having to climb up on the body sides or deck.

In order to compensate for loss by cold air flow into the atmosphere, said older type of delivery truck requires a refrigerator system considerably larger in cooling capacity than is herein needed. It has been found that an attendant can conveniently reach inwardly from one body side to a limited distance of about four feet at most, which in turn correspondingly restricts the usable body width of a refrigerated chamber when equipped with side or top doors. The absence of projecting side door hardware in the manner herein devised, allows of correspondingly following up the useful body width and also obviates the accident hazard associated with an opened side door.

Furthermore, the theft hazard as regards stolen goods is herein vertually eliminated because my chamber door is kept in sight of the seated driver. Both the unloading time and labor at stops are also materially reduced. In lieu of plural body side or top openings into the refrigerating chamber, there is substituted a centrally cleared aisle of which the forward walk-in end is commanded by a single door that needs to be kept open for a short duration. In addition, a characteristically neat, trimmed appearance may be imparted to the exterior body lines. The absence of side doors leaves the painted body side panels free for unobstructed display advertising without being scruffed or otherwise depreciated by the handling of heavy cans in the vicinity thereof. As a further advantage, the limited time during which my single door needs to be held open, vitally restricts the entrance of fresh moist air and thus permits the coil defrosting period to be correspondingly extended. The cited improvements are reflected in inherently lowered unit operating costs and all of which especially fit my improved refrigerated truck to cover a long delivery route in a comparatively short time.

The primary object of the present invention is to find a satisfactory solution for overcoming certain deficiencies in the prior art by devising a delivery truck of the indicated character equipped with a refrigerated cargo chamber adapted to be held at a substantially uniform temperature by the use of a single walk-in door of the air trapped type that while open, shall conserve the refrigerated air against dissipation, said body installation being efficient, unique in exterior appearance and capable of performing in a commercially effective manner when required to make frequent stops in delivery service.

Embodied herein are also other novel structural aspects that will presently be described in detail. Reference is had to the accompanying three sheets of drawings which are illustrative of a preferred exemplification, and in which drawings:

Fig. 1 represents an elevational exterior view of a stream-lined truck embodying my invention, and Figs. 2 and 3 respectively show a front and a top view thereof.

Figure 6:
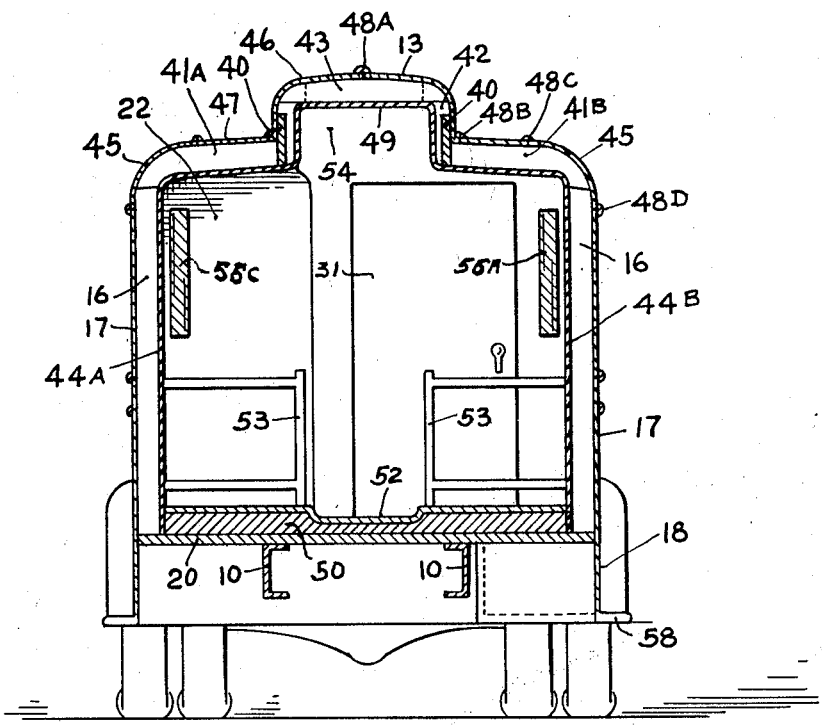
Figure 4:
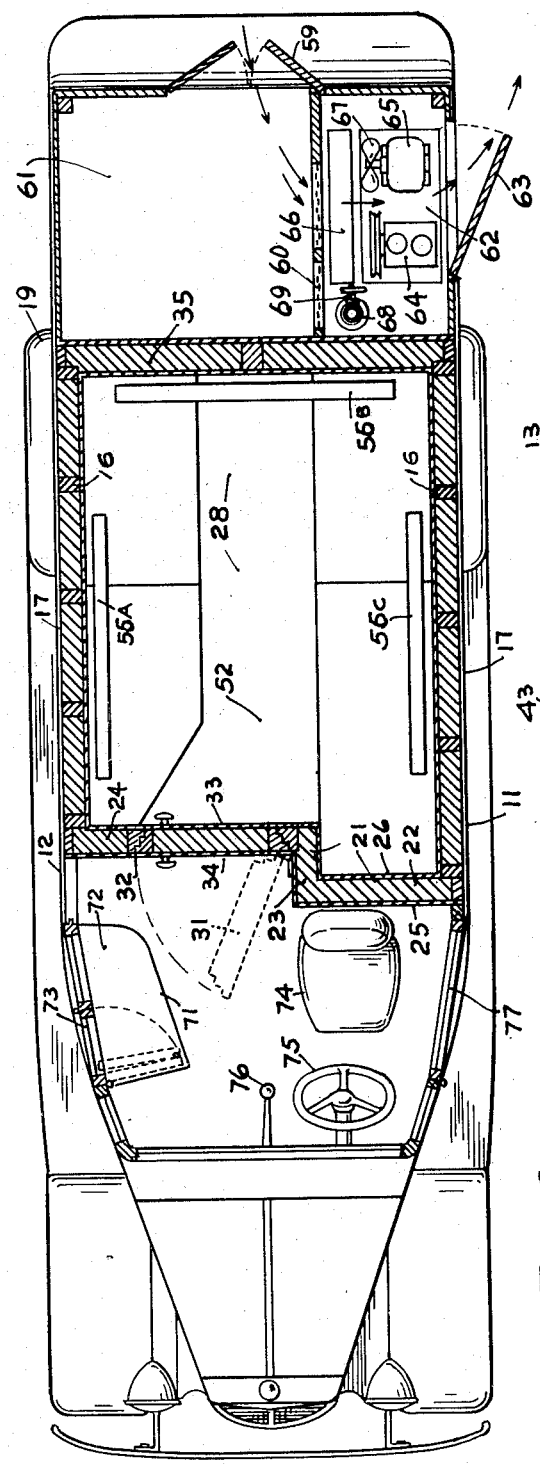
Figure 5:
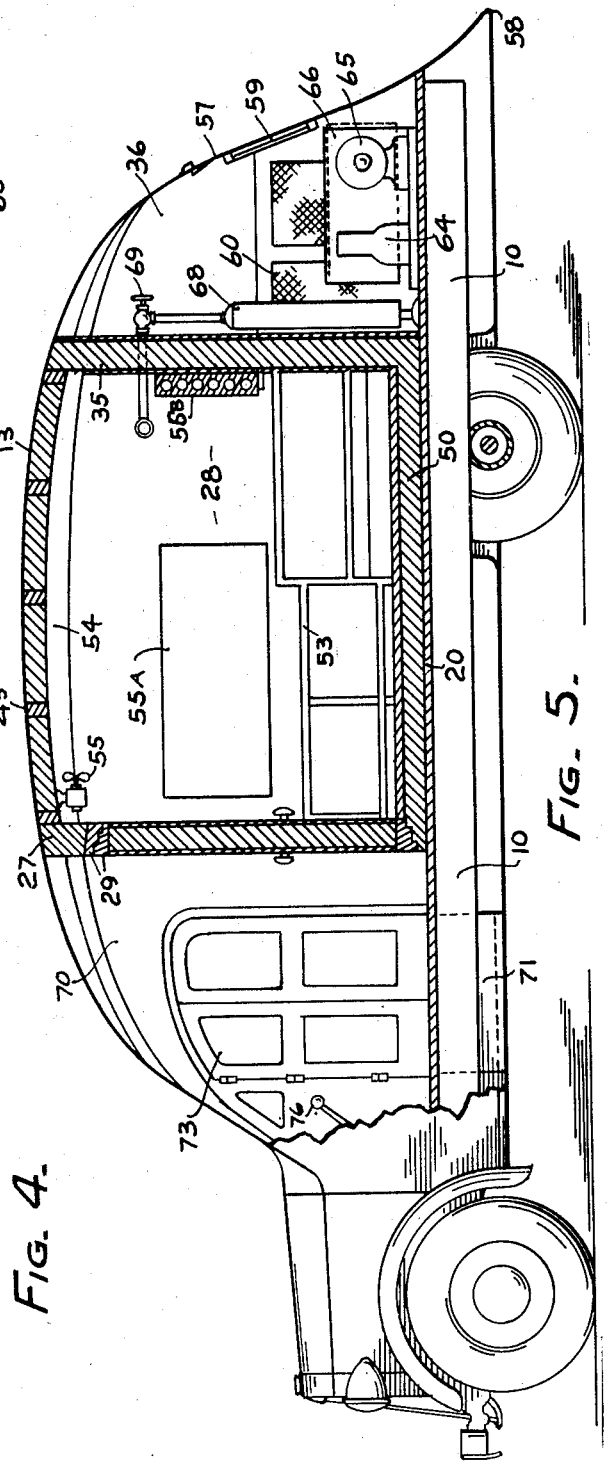

Figs. 4, 5 and 6 are sectional views respectively taken along lines 4—4, 5—5 and 6—6 of Figs. 1 and 3.

Referring in detail to said drawings, this assembly may comprise a pair of non-offset or longitudinally straight chassis beams 10 having a unitary truck body mounted thereon. The complementary side walls such as 11 and 12 support a monitor type of deck 13 of which the underlying plural carlings or sectionalized transverse bows are centrally offset to constitute a raised hood section. The respective outer bow ends may be upheld by wooden posts such as 16 to which the plain side panels or sectionalized metal sheathings 17 are exteriorly attached in a conventional manner. Said panels may be extended downwardly beneath a continuous chassis beam to form a skirt portion 18 that is adjoined to a rear wheel housing or guard 19 whose crown may lie above the level of the body floor 20 in the manner indicated.

The body loading space is divided by the insulated stepped front partition or forward bulkhead 21 that may be cross-sectionally shaped to include a transverse offset component 22, a short longitudinal length component 23 and a doorway component 24, which latter is preferably arranged in substantial parallelism with the wall member 22, as shown.

The opposed faces of such bulkhead are exteriorly and interiorly metal sheathed in spaced relation as at 25 and 26, suitable insulating material being inserted therebetween to counteract heat exchange with respect to the refrigerated intermediate body or pay load storage chamber 28. The sill, lintle and interconnecting jambs of said doorway component are shown cross-sectionally stepped as at 29 and each step may be packed with an interposed soft gasket such as a strip of sponge rubber to make a tightly fitted seal when the hinged door 31 is closed thereagainst and hung to swing forwardly from its inner jamb. The hollowed wooden door frame 32 is also provided with inner and outer metal sheaths such as 33 and 34 and which spacing is likewise filled with suitable heat insulating material. The disposition is such that wood spacer strips interrupt direct metallic conduction between the respective door sheaths.

At the other end region of my body, an insulated rear bulkhead 35 is similarly installed except that this is devoid of any door or the like large vent opening therethrough. The tail end compartment 36 lying rearward of the bulkhead 35 is preferably utilized for the installation of a compressor unit and may be subdivided to store empty cans or the like.

The medial region of my novel roof structure may comprise a pair of laterally spaced headers or purlins 40 extending longitudinally of the body and serving to support the inner ends of mated bow sections such as 41A and 41B. Adjacent faces of said headers carry upright filler blocks 42 that are bridged by the transverse filler blocks 43. The respective inner edges of the upright posts 16 are spanned by metallic side linings such as 44A, 44B, etc., in spaced relation to the body panels 17, such spacing also being filled with heat insulating material of substantial thickness where needed to constitute the sealed refrigerator chamber 28. The top edge of each bulkhead may be provided with an upwardly projecting tongue 27 (see Fig. 5) that is snugly enterable into the monitor mouth so as to complete the closure of my cargo chamber.

The roof exterior is preferably covered by a series of strips of sheet metal whose edges abut lengthwise. Components thereof may include opposed corner sheaths such as 45 and a split hood or crown sheath 46 having a vertically disposed wing adjoining each outer face of the spaced headers 40, said wings being respectively shaped to match with the inner edge of an intermediate deck strip 47. The mated edge regions of the respective deck strips are preferably slip jointed with a weather tight seal by the use of superimposed mouldings such as 48A, 48B, etc., which allow the underlying sheath edges to compensate for heat expansion and body weave. Galvanized sheet iron or the like lining 49 may be attached interiorly of my monitor and packed with insulating material where needed. The marginal lining elements that respectively underlie the deck strip 47 determine the normal height of the body ceiling and the raised monitor lining 49 is cross-sectionally offset with respect to the level of such ceiling. Said linings and the exterior body sheaths are again kept spaced apart by wooden breaker means to prevent direct metallic heat conduction therebetween.

In a similar manner the body floor boards of the cooling chamber 28 carry a thick layer of insulation as at 50 and which as shown, affords a relatively narrow gangway or walk 52 extending centrally lengthwise of the vehicle and rearwardly from the sill of my single full-height doorway. The upturned face of my floor insulation is purposely kept beneath the crown of the rear wheel housing 19 to conserve pay load space. The raised floor level on each side of such gangway may be equipped with a skeletonized rack 53 to stack assorted products thereon for refrigeration, the lowest rack tray being kept elevated to some extent to facilitate upward air circulation underneath and around the goods stored thereon. Serviced products may be stacked up to the ceiling and still afford ready access thereto by virtue of the supplementary head room afforded over my walk-in aisle.

It will be observed that the offset turret is cross-sectionally shaped to constitute an inverted air duct or trough 54 disposed directly above said walk, the inlet or mouth of this trough being kept open throughout its length to augment head room. In addition, the slightly arched bow linings are so arranged that any rising air current when partially warmed by the chamber contents, will by gravity naturally tend to drift toward and collect within said trough. An electrically driven circulating fan 55 may be disposed overhead at one end of this trough to artificially propel any accumulated warmer air lengthwise of the hood and downwardly into contact with the plural cooling or evaporating coils that may be fashioned in special plate form such as 55A, 55B, 55C, etc., and interiorly distributed alongside the vertical linings or deck of my refrigerator chamber.

Referring in further detail to the construction of my tail compartment 36, the corner deck strips 45, the intermediate strips 47 and split hood sheaths 46 are preferably extended rearwardly and headed downwardly to overlappingly engage the top edge of a sloping tail plate 57. Said plate in turn terminates in the reenforcing rub rail 58 that likewise trims the bottom edge of the panel skirt 18. A closable ventilator port 59 is incorporated in the medial region of this tail plate to admit fresh air, when opened.

If desired, the compartment 36 may be partitioned by a longitudinal screen 60 to afford a can storage space 61 and a compressor space 62. The latter may have an outlet side door 63. A multi-cylinder refrigerator compressor 64 is preferably arranged with its crankshaft axis set normal to a side wall and has belted thereto, a constant speed electric motor 65 whose armature is disposed in parallelism with said shaft axis, as indicated in Fig. 4. An air cooled condenser 66 of the typical flat fin type is preferably directed crosswise of but near one end of the motor armature, which latter may be equipped with a suction fan 67. The driven refrigerator unit is intended to be intermittently plugged into and run from a live wiring circuit while the loaded truck is laid up for the night in a garage or central depot, at which time both the ventilator port 59 and the side doors 63 are kept open to induce cooling air to flow through the condenser at the instigation of the suction fan 67.

The compressed refrigerant agency such as methyl chloride or the like refrigerant, after being liquified in the condenser, is delivered and charged into a suitable liquid receiver or hold-over tank 68. Thence under control of an expansion valve 69, such fluid may be slowly fed in series to the pipe interconnected evaporating coils 56A, 56B, etc., as needed to hold the refrigerating chamber 28 at a prescribed temperature. The vaporized cooling liquid is finally returned from said coils through the rear bulkhead to the compressor in a closed circuit in a conventional manner under the control of automatic temperature regulating devices (not shown).

More efficient results are to be had when the condenser of a compressor unit is installed to establish an active air current therethrough while the compressor unit is being operated in the stalled truck. A sufficient supply of liquified refrigerant is thereby stored up to cool the chamber 28 for a protracted period after disconnecting the motor circuit prior to closing both the ingress port 59 and the egress door 63, while en route.

It will be apparent that the compressor power may be taken off of the chassis motor or as a substitute, resort may be had to dry ice. Such cooling treatment has not in practice, been found to afford the same low cost performance as does my preferred embodiment.

As a further structural feature, the cab or motor control section 70 is located forwardly of the refrigerator chamber 28 and within the body side walls 11 and 12. A portion of the monitor may be continued forwardly to provide for additional head room for the cab compartment, in which instance, the front bulkhead is raised to block off the inverted channel 54. The floor level of such cab may lie flush with that of the intermediate chamber except for the superimposed layer of insulation 50. An entrance pit 71 is shown sunk into the curb side of said cab floor to include a platform 72 that lies one step above the road bed. This platform is disposed outwardly from its contiguous chassis beam. Because of the heavy body weight herein carried, each such beam is preferably kept straight in accordance with standardized frame construction without provision for any lateral inset or drop section. Said platform serves as a sill for the foldable side door 73 that when open, collapses within the cab width confines and out of the path of traffic.

When striving to attain a fully stream-lined body effect against windage, the cab front may be equipped with a conventional rearwardly inclined rectangular windshield whose circumscribing sash is preferably disposed to fall into a common plane with the front wheel centers, as shown. Such stream-line effect may be further promoted by giving the longitudinal sheath profile a continuous arc-like contour whose respective ends merge with a contiguous lower deck portion.

A short driver's seat 74 may be transversely mounted ahead of the offset bulkhead component 22, said cab being provided with a steering wheel 75 and other vehicle controls including a gear shift lever 76 placed forwardly of the inner end of said seat, as shown. The cab compartment 70 is herein devised as a closable vestibule or antechamber capable of cooperating with the refrigerated chamber, it being emphasized that the gross volumetric content of the antechamber is herein kept smaller than that of the cargo chamber in order that the refrigerated chamber temperature shall not be allowed to rise excessively by dissipation while servicing allocated goods. The closed side door 73 then serves to trap and thereby prevent the unobstructed venting of cold air from my intermediate chamber while the unseated driver expeditiously opens the walk-in door 31 to step along the cleared gangway 52 and fetch any desired shipment of frozen products out of the lighted chamber 28. It is emphasized that by virtue of my body arrangement, such selection of goods may be made while said door remains closed and thus provide a safeguard against undue dissipation of refrigeration. The resulting considerable saving in the expenditure of cooling fluid, allows of correspondingly extending the mileage of a given virgin charge of such liquid. Said walk-in door is mounted to swing forwardly over the pit without interference with the side door 73, whether opened or closed. If desired, a supplementary side door 77 may also be provided for, but this emergency cab exit is non-essential.

For best results, it is desirable to maintain the air content of a refrigerated chamber in a relatively dry condition. The amount of fresh replacement air of a higher humidity that is from time to time allowed to drift into such chamber has a direct bearing upon the frequency with which the evaporating plates 56A, 56B, etc., will have to be defrosted, it being evident that the excess moisture content of such introduced relatively warmer air will eventually lodge and accumulate upon the plate surfaces. In order to periodically melt such icelike deposit by a defrosting operation, the whole of the intermediate chamber must usually be raised in temperature and recooled. Each such treatment is likely to put a refrigerated truck out of commission for successive days and consequently require the use of a spare truck, particularly in peak summer season. The need for defrosting may be ameliorated by resort to a single chamber door in which the escape of cold air spill is adequately trapped.

By virtue of my door and deck hood improvements, the ratio of pay load to tare weight of a thickly insulated refrigerator truck may be materially increased over prevailing practice. In an actual installation, a lighter chassis can carry and service a maximum load of close to 600 gallons of bulk ice cream as against about 500 gallons for a heavier chassis when provided with regular body side doors of the kind previously cited, and still comply with all State restrictions regarding gross weight and body width. In addition, such transported heavier load may be delivered to scattered customers at a decidedly lower dissipation of refrigerated air at a substantial saving in unloading time because of the improved facility in handling the allocated cargo.

The pay load together with the inherently heavy tare weight of my body are also properly distributed for maximum wheel traction. By the allowable use of a relatively wide cooled body chamber that can still be effectively served, the driver is enabled to dispatch the delivery of frozen products in a prime condition and thereby increase his route accounts. Other practical advantages afforded by my disclosures will, it is believed, be apparent to those skilled in this art, it being understood that various changes in the illustrative embodiment thereof may be resorted to, all without departing from the spirit and scope of my invention heretofore described and more particularly pointed out in the appended claims.

I claim:

1. A motorized refrigeration truck comprising a unitary body with opposed side walls that are spanned by a roof providing a ceiling for the space within said body and which body is partitioned to divide the same into a forwardly located driver's compartment, an adjacent cargo chamber, and another compartment, means in the last named compartment for supplying refrigerant to the cargo chamber, the interior of said cargo chamber being arranged to form an aisle extending rearwardly from the driver's compartment and a medial span region of said roof being shaped to constitute a cross-sectionally raised monitor portion elevated lengthwise over said aisle with unobstructed head room for an adult of at least normal height, access door means affording entrance from the driver's compartment to the forward end of said aisle and which door means extends in height substantially from the body floor level to said ceiling, and side door means affording entrance to the driver's compartment from the road bed and arranged to form a substantially airtight closure with the body of the truck.

2. A motorized refrigeration truck comprising a unitary body with opposed side walls that are spanned by a roof providing a ceiling for the space within said body and which body is divided by a transverse front partition and a rear partition into a closable driver's compartment, an intermediate cargo chamber, and a tail compartment, a seat in said driver's compartment located alongside of the front partition, means in the tail compartment for supplying refrigerant to the cargo chamber, the interior of said cargo chamber being arranged to form an aisle extending rearwardly from the front partition and a medial span region of said roof being shaped to constitute a cross-sectionally raised monitor portion elevated lengthwise over said aisle with unobstructed head room for an adult of at least normal height, an access door affording entrance through the front partition to the forward end of said aisle, a jamb of said door being arranged contiguous to the driver's seat and extending in height substantially from the body floor level to said ceiling, and side door means affording entrance to the driver's compartment from the road bed and arranged to form a substantially airtight closure with the body of the truck.

3. A structure of the type defined in claim 1 wherein the interior of the enclosed cargo chamber is lined with insulating material and service racks for stacking allocated cargo are mounted along either side of said aisle to leave a cleared walk-in passageway by which to expedite delivery of such cargo irrespective of the side wall spacing and which rack disposition affords a relatively large pay load capacity proportionate to the tare weight of the refrigerated truck.

4. A structure of the type defined in claim 2 wherein the monitor portion of said roof enclosing the cargo chamber is lined with insulating material and provided with an exteriorly streamlined crown sheath raised above the ceiling height, the longitudinal profile of said sheath extending inclinedly downward beyond the front partition in continuous arc-shaped contour to merge with a lower forward roof portion.

5. A structure of the type defined in claim 1 wherein the interior of the enclosed cargo chamber is lined with insulating material and the monitor of said roof portion is provided with an exteriorly stream-lined crown sheath component extending lengthwise over said aisle, the stipulated head room being had without correspondingly raising the height of the body side walls and thereby obviating top heavy body appearance.

6. A structure of the type defined in claim 2 wherein the interior of the enclosed cargo chamber is lined with insulating material, the front and rear partitions respectively each including an upwardly extending tongue entered into the monitor mouth to complete the enclosure of the cargo chamber.

7. A structure of the type defined in claim 2 wherein the interior of the enclosed cargo chamber is lined with insulating material and in which the access door means through the front partition constitutes the sole entrance into the cargo chamber and which driver's compartment when closed by the side door means serves as an air trapping vestibule arranged to restrict dissipation of refrigeration from said cargo chamber while the access door means thereof is being kept open.

8. A structure of the type defined in claim 2 wherein the interior of the enclosed cargo chamber is lined with insulating material and in which a body tail plate bridges the rear ends of the side walls, the monitor being arranged to include a crown sheath elevated above the ceiling level and extending beyond the front and rear partitions to merge rearwardly with said tail plate and to merge forwardly with a lower roof portion.

9. A structure of the type defined in claim 2 wherein a body tail plate spans the rear ends of the side walls and the monitor portion of said roof includes a pair of headers bridged by a series of blocks arranged to uphold a lined metallic cover sheath that is arranged between complementary metallic corner strips and which sheath and strips extend beyond the front and rear partitions to merge forwardly with a contiguous lower roof portion and to merge rearwardly with said tail plate.

10. A structure of the type defined in claim 1 wherein service racks stackable with allocated cargo are mounted along either side of said aisle and the crown of the monitor is disposed in the highest chamber region as an inverted trough shape arranged to naturally collect the convection currents that may arise from the allocated cargo during the cooling thereof and which collected currents are conveyed lengthwise of such trough shape.

11. A structure of the type defined in claim 1 wherein the means for supplying refrigerant include a cooling element located in the cargo chamber and the refrigerated cargo chamber is given a relatively large volumetric content of which all portions freely intercommunicate, the closed driver's compartment serving as an air trapping vestibule arranged to restrict dissipation of refrigeration from said cargo chamber and having a gross volumetric content that is materially smaller than that of the cargo chamber whereby to proportionately retard dissipation of refrigeration while the access door means is being intermittently opened.

BYRON S. SNOWDEN.